UNITED STATES PATENT OFFICE.

FREDERIC H. KENNARD, OF NEWTON, MASSACHUSETTS.

PROCESS OF REDUCING WASTE SULFITE LIQUOR TO A POWDER.

1,138,118.     Specification of Letters Patent.     Patented May 4, 1915.

No Drawing.     Application filed January 2, 1914. Serial No. 810,099.

*To all whom it may concern:*

Be it known that I, FREDERIC H. KENNARD, a citizen of the United States, residing at Newton, in the county of Middlesex and State of Massachusetts, have invented an Improvement in Processes of Reducing Waste Sulfite Liquor to a Powder, of which the following is a specification.

My invention relates to a process for the reduction to a dry powdery condition of waste liquor from the manufacture of cellulose from wood by the sulfite process and to the product derived from such process. Various methods have been suggested for concentrating waste sulfite liquor, but direct evaporation has been found to decompose the material unless some method is adopted to prevent this result and other methods suggested require the addition of chemicals, which change the material from the product I desire to produce and increase the expense of the process.

I begin my process with the sulfite waste liquor in the acid state in which it is produced as a result of the sulfite process, although it is not important to prevent the free sulfurous acid gas from escaping so far as it will, the acid which remains in solution being sufficient. I then concentrate the liquid in a vacuum at a moderate heat until it has been concentrated to a highly viscous state. I have found about 30° Baumé satisfactory. Care should be used, in this early part of the evaporation, not to permit the material to become over-heated generally or locally. I have found that a temperature of about 205° F is satisfactory for the first part of the evaporation, which may be reduced as the material grows thicker to 138° F. Any suitable vacuum pan may be used. When the material has been reduced to this highly viscous state, it will decompose readily if evaporated under ordinary conditions, but I have found that if it is heated in a very thin sheet in a vacuum at a low temperature, it may be reduced to dryness without change of composition from that of the original liquor other than the driving off of the water and free gases.

There are many means which could be adopted for carrying out the second part of this process. A satisfactory way is to apply the material in a thin sheet to a hollow rotating metal drum heated to about 135° F. by interior heat. This drum is within a vacuum chamber. The viscous material should be applied to the lower part of the roll and evened by a spreading device preferably adjusted from outside the chamber. The stream will adhere to the roll and proceed around it, drying as it turns, and the speed rotation and thickness of sheet should be so adjusted that the evaporation will be complete before the liquid has made a complete turn. The dried material should then be scraped off the roller and allowed to fall to the bottom of the vacuum chamber, for instance, by a scraper in contact with the roll and the cleaned surface of the roller will then be ready for more material. In this way the process is continuous, unless the vacuum chamber is opened to withdraw the product, and I prefer to use means to permit the withdrawal of the material without breaking the vacuum.

While this device is obviously expeditious, the same process may obviously be carried out in many other ways, so long as the vital feature of applying the material in a thin sheet to a heated surface in a vacuum chamber is preserved.

For most purposes the dried material can be more readily used after it has been reduced to a powder, and this process will reduce it into a powder but if desired it may be further ground to remove all lumps or improve the texture.

The dried product is a very strong adhesive, satisfactory for many purposes. I have suggested one of these uses, namely; binding cores for castings, in a co-pending application, but there are many other uses for this product.

My new product differs from previous products and is characterized by having an acid reaction, by causing a precipitate with gelatin solution and by having substantially the same chemical composition as the sulfite waste liquor from which it was produced, except for the absence of the volatile materials.

I have used the term "in a vacuum" in this specification to mean operation in a chamber from which the atmospheric pressure has been removed to a substantial extent. I prefer to use a good commercial vacuum, say 27 inches of mercury, but much less may be used without harm to the product, although it will slow up the process.

The term "dryness" in this specification does not mean the absolute elimination of water, but merely such a state of dryness that the product will readily fall into a powder. 8% of moisture is rather an advantage than otherwise.

I claim:—

1. The process of reducing waste sulfite liquor to a powder by first concentrating the same to a viscous state in a vacuum and then applying the viscous material in a vacuum in a thin sheet onto a heated surface and retaining the same thereon until the viscous liquor is evaporated to dryness.

2. A new article of manufacture consisting of the powdered dry product from the evaporation of waste sulfite liquor having an acid reaction, the original composition being substantially conserved.

In testimony whereof, I have signed my name to this specification, in the presence of two subscribing witnesses.

FREDERIC H. KENNARD.

Witnesses:
HECTOR M. HOLMES,
GEORGE C. ARVEDSON.